United States Patent Office 3,461,187
Patented Aug. 12, 1969

3,461,187
GRAFT COPOLYMERS OF POLYCARBONATE ON AN ADDITION POLYMER BACKBONE
James E. Cantrill, Lenox, Mass., assignor to General Electric Company, a corporation of New York
No Drawing. Filed Dec. 2, 1965, Ser. No. 511,243
Int. Cl. C08g *17/14, 39/10*
U.S. Cl. 260—873      4 Claims

ABSTRACT OF THE DISCLOSURE

Graft copolymers of aromatic polycarbonates on a polymeric backbone are prepared by polymerizing the polycarbonate in the presence of a polymer of an ethylenically unsaturated monomer having pendant carbonate precursor groups such as hydroxyl, carboxyl or amine. A preferred polymer backbone is a butyl methacrylate-hydroxyl ethyl methacrylate copolymer.

---

This invention relates to thermoplastic graft copolymers and more particularly to a thermoplastic graft copolymer of a polymer backbone and an aromatic polycarbonate.

In recent years a great deal of effort has been devoted to the preparation and properties of thermoplastic graft copolymers. A graft copolymer consists of a backbone of one type of polymer or copolymer to which branches of another kind of polymer or copolymer are attached. Graft copolymerization is well suited to the production of poymers which are modified to eliminate undesirable properties and to thereby produce desirable properties. For example, the stress-cracking tendencies of polycarbonates can be reduced by grafting polycarbonate chains onto a backbone polymer through functional groups. The tensile heat distortion temperature of a polycarbonate graft copolymer rises to a maximum and then decreases as backbone content increases in many cases. Thus, graft copolymerization provides a means of preparing copolymers having tailored properties.

One of the objects of the present invention is to provide a thermoplastic graft copolymer in which polycarbonate groups are grafted onto a polymer backbone.

It is another object of the invention to provide a process for producing thermoplastic graft copolymers in which polycarbonate groups are grafted onto a polymer backbone.

These and other objects of this invention will become apparent from the following detailed description thereof.

Briefly, according to the invention, the foregoing and other objects are attained by reacting a polymer backbone containing functional groups pendant thereon with an aromatic polycarbonate, which aromatic polycarbonate is the reaction product of a dihydric phenol and a carbonate precursor to produce a thermoplastic graft copolymer. The functional groups pendant on the polymer backbone can be either a hydroxyl, a carboxyl or an amine group, or mixtures thereof.

The following examples are set forth to illustrate more cleary the principle and practice of this invention to those skilled in the art. Unless otherwise specified where parts are mentioned, they are parts by weight.

Example 1

A solution of 43 g. methyl acrylate, 0.38 g. acrylic acid, and 0.5 g. 4,4′-azo-bis-isobutyronitrile in 43 g. toluene are irradiated with a sunlamp 12 inches away under a nitrogen atmosphere for 30 minutes. The solution becomes viscous and the temperature rises to 70° C. The reaction is continued with intermittent irradiation for an additional 32 minutes of irradiation time. The resulting polymethyl acrylate (PMA) solution consists of 45% solids.

Portions of PMA solution made as described above, bisphenol-A (BPA) and phenol were dissolved in 380 g. methylene chloride and 45 g. pyridine and phosgenated at a rate of 0.5 g. per minute until a temperature drop was observed. A solution of 18 ml. of concentrated hydrochloric acid in 100 ml. of water was slowly added. The polymer was precipitated and washed with methanol. The amounts and yields of the individual polymers are given below in Table I. Intrinsic viscosities were measured in dioxane at 30° C.

TABLE I

| PMA, percent | BPA, g. | PMA solution, g. | Phenol, g. | Polymer yield, g. | Polymer $(n)$, dl./g. |
|---|---|---|---|---|---|
| 2 | 57 | 2.6 | 0.019 | 61 | 0.96 |
| 4 | 57 | 4.9 | 0.034 | 60 | 1.26 |
| 40 | 30 | 43.0 | 0.300 | 46 | 0.85 |
| 8 | 57 | 10.0 | 0.050 | 65 | 0.76 |
| 15 | 57 | 20.0 | 0.100 | 68 | 0.55 |
| 25 | 57 | 40.0 | 0.200 | 77 | 0.81 |

Films of the polymers described in Table I were cast from methylene chloride solution on a glass plate. Properties measured on these films are given below in Table II.

TABLE II

| | Weight percent PMA | | | | | |
|---|---|---|---|---|---|---|
| | 2 | 4 | 8 | 15 | 25 | 40 |
| $(n)$, dl./g. | 0.96 | 1.26 | 0.76 | 0.55 | 0.81 | 0.85 |
| Tensile Heat Distortion, 50 p.s.i., ° C. | 177 | 189 | 163 | 147 | 1e39 | 120 |
| Tensile Modulus, p.s.i. $\times 10^{-5}$ | 2.05 | 1.98 | 1.94 | 1.74 | 1.49 | 1.81 |
| Yield, p.s.i. $\times 10^{-3}$ | 8.54 | 8.52 | 8.42 | 7.07 | 5.70 | 5.23 |
| Ultimate, p.s.i. $\times 10^{-3}$ | 9.57 | 8.40 | 7.36 | 6.52 | 5.36 | 4.69 |
| Elongation, percent | 140 | 89 | 55 | 15 | 22 | 19 |
| Critical Elongation, percent: | | | | | | |
|   Acetone | 0.95 | 1.70 | 1.21 | 1.04 | 4.11 | |
|   Heptane | 0.93 | 0.76 | 0.85 | 1.06 | 0.83 | 0.95 |
|   CCl$_4$ | 0.30 | 0.30 | 0.24 | 0.20 | 0.24 | 0.17 |

Example 2

A solution of 50 g. methyl methacrylate, 0.36 g. acrylic acid and 0.5 g. 4,4′-azo-bis-isobutyronitrile in 50 g. of toluene was irradiated with a sunlamp under a nitrogen atmosphere for 8 hours. The polymer solution was poured into methanol and dried at 80° C. overnight. A white powder, 19 g., with an intrinsic viscosity in acetone at 25° C. of 0.20 dl./g. (corresponding to a molecular weight of 79,000) was obtained.

Example 3

A solution of acrylic acid and 4,4′-azo-bis-isobutyronitrile (AIBN) in methyl methacrylate was added to a stirred solution of disodium hydrogen phosphate and polyacrylic acid (Carbopol 940 made by B. F. Goodrich) in water. The mixture was stirred and heated under a nitrogen atmosphere for 150 minutes and then filtered. The beads were washed with water and dried at 80° C. The amounts and yields of the polymers are given below in Table III.

TABLE III

| Methyl methacrylate, g. | Acrylic acid, g. | AIBN, g. | NaHPO$_4$, g. | Carbopol, g. | H$_2$O, ml. | Polymer yield, g. | Polymer $(n)$, dl./g. | Molecular weight |
|---|---|---|---|---|---|---|---|---|
| 20 | 0.158 | 0.50 | 1 | | 40 | 16 | 0.30 | 138,000 |
| 106 | 0.72 | 1.25 | 10 | 1.5 | 300 | 63 | 0.48 | 263,000 |

The intrinsic viscosities were run in acetone at 25° C. and the molecular weights were calculated from them.

Example 4

A solution of poly(methyl methacrylate-co-acrylic acid) (PMMA) prepared as in Example 2 or 3, bisphenol-A and phenol in 45 g. of pyridine and 380 g. of methylene chloride was phosgenated at a rate of 0.5 g. per minute until a temperature drop was observed. A solution of 18 ml. of concentrated hydrochloric acid in 100 ml. of water was slowly added. The polymer was precipitated and washed with methanol. The amounts and yields of the polymers are given below in Table IV. Intrinsic viscosities were measured in dioxane at 30° C.

TABLE IV

| PMMA, percent | BPA, g. | PMMA, g. | PMMA, molecular weight | Phenol, g. | Polymer, yield, g. | Polymer (n), dl./g. |
|---|---|---|---|---|---|---|
| 2 | 58.8 | 1.2 | 138,000 | 0.021 | 62 | 0.90 |
| 5 | 57.0 | 3.0 | 138,000 | 0.040 | 62 | 0.84 |
| 10 | 54.0 | 6.0 | 79,000 | 0.107 | 62 | 0.66 |
| 15 | 51.0 | 9.0 | 79,000 | 0.150 | 60 | 0.75 |
| 50 | 25.0 | 25.0 | 263,000 | 0.280 | 47 | 0.64 |

Films of the polymers described in Table IV were cast from methylene chloride solution on a glass plate. Properties measured on these film are given below in Table V.

TABLE V

| | Weight percent PPMA | | | | |
|---|---|---|---|---|---|
| | 2 | 5 | 10 | 15 | 50 |
| (n) dl./g. | 0.90 | 0.84 | 0.66 | 0.75 | 0.64 |
| Tensile Heat Distortion, 50 p.s.i. load,° C. | 177 | 161 | 168 | 153 | 148 |
| Tensile Modulus, p.s.i. ×10⁻⁵ | 1.93 | 2.12 | 2.13 | 2.06 | 2.77 |
| Yield, p.s.i.×10⁻³ | 8.18 | 9.43 | 9.80 | 9.86 | |
| Ultimate, p.s.i.×10⁻³ | 9.02 | 8.88 | 9.50 | 9.38 | 8.98 |
| Elongation, percent | 138 | 141 | 142 | 145 | 8 |
| Critical Elongation, percent: | | | | | |
| Acetone | 0.90 | 0.64 | 0.59 | 0.57 | 0.32 |
| Heptane | 0.57 | 0.35 | 0.52 | 0.64 | 0.70 |
| CCl₄ | 0.98 | 0.96 | 0.98 | 1.03 | 1.70 |

Example 5

A solution of 64.2 g. of butyl acrylate, 0.36 g. acrylic acid and 0.5 g. of 4,4'-azo-bis-azo-butyronitrile in 214 g. of toluene was irradiated with a sunlamp under a nitrogen atmosphere for two hours. The resulting solution consisted of 21% solids. The polymer had an intrinsic viscosity in acetone at 25° C. of 0.27 dl./g., which corresponds to a molecular weight of 58,800.

Example 6

A mixture of 196.1 g. butyl acrylate, 1.11 g. acrylic acid, 13 g. sodium stearate, 0.5 g. ammonium persulfate and 400 g. of water was stirred to establish an emulsion and then refluxed for 30 minutes. The mixture was steam-distilled to remove excess monomer and then coagulated with a 5% sodium chloride solution. After washing several times with water, the rubbery particles were dried. The 150 g. of amber rubber had an intrinsic viscosity in acetone at 25° C. of 0.90 dl./g., which corresponds to a molecular weight of 292,600.

Example 7

A solution of poly(butyl acrylate-co-acrylic acid) (PBA), prepared as in Example 5 or 6, bisphenol-A and phenol in 47.5 g. of pyridine and 400 g. of methylene chloride was phosgenated at a rate of 0.43 g. per minute until a temperature drop occurred. A solution of 18 ml. of concentrated hydrochloric acid in 100 ml. of water was slowly added. The polymer was precipitated and washed with methanol. The amounts and yields of the polymers are given below in Table VI. Intrinsic viscosities were measured in dioxane at 30° C.

TABLE VI

| Low molecular weight (58,800) PBA, percent | BPA, g. | PBA solution, g. | Phenol, g. | Polymer yield, g. | Polymer (n), dl./g. |
|---|---|---|---|---|---|
| 5 | 57 | 14 | 0.041 | 58 | 0.67 |
| 10 | 54 | 28 | 0.081 | 58 | 0.65 |
| 15 | 51 | 42.5 | 0.123 | 61 | 0.61 |
| 5 | 57 | 3 | 0.041 | 65 | 0.67 |
| 10 | 54 | 6 | 0.080 | 66 | 0.75 |
| 15 | 51 | 9 | 0.123 | 62 | 0.82 |

Films of the polymers of Table VI were cast on a glass plate from methylene chloride solution. Properties measured on these films are summarized below in Table VII.

TABLE VII

| | Low molecular weight PBA | | | High molecular weight PBA | | |
|---|---|---|---|---|---|---|
| Weight percent PBS | 5 | 10 | 15 | 5 | 10 | 15 |
| (n), dl./g. | 0.67 | 0.65 | 0.61 | 0.67 | 0.75 | 0.82 |
| Tensile Heat Distortion, 50 p.s.i. load,° C. | 155 | 153 | 152 | 164 | 154 | 176 |
| Tensile Modulus, p.s.i.×10⁻⁵ | 1.98 | 1.76 | 1.76 | 1.85 | 1.65 | 1.54 |
| Yield, p.s.i.×10⁻³ | 9.42 | 7.73 | 7.62 | 7.37 | 6.43 | 6.04 |
| Ultimate p.s.i.×10⁻³ | 10.3 | 8.46 | 6.82 | 6.58 | 6.23 | 6.02 |
| Elongation, percent | 169 | 145 | 23 | 18 | 89 | 38 |
| Critical Elongation, percent: | | | | | | |
| Acetone | 0.32 | 1.00 | 0.99 | 0.95 | 2.3 | 2.5 |
| Heptane | 0.31 | 0.45 | 0.38 | 0.23 | 0.26 | 1.40 |
| CCl₄ | 0.82 | 1.30 | 1.34 | 0.95 | 2.2 | 3.09 |

Example 8

A mixture of 200 g. butyl methacrylate, 1.02 g. acrylic acid, 6 g. of polyethylene oxide surfactant (Triton X-100), 4 g. of sodium heptadecyl sulfate (Tergitol), 6 g. sodium stearate, 0.03 g. ammonium persulfate and 400 g. of water was stirred together to form an emulsion. The mixture was refluxed, and it spontaneously coagulated after two hours. The coagulated polymer was washed with water and methanol and dried under reduced pressure. The polymer had an intrinsic viscosity in chloroform at 25° C. of 1.74, which corresponds to a molecular weight of 564,000.

Example 9

A solution of poly(butyl methacrylate-co-acrylic acid), prepared as in Example 8, bisphenol-A and phenol in 47.5 g. of pyridine and 400 g. of methylene chloride was phosgenated at a rate of 0.43 g. per minute until a temperature drop was observed. A solution of 18 ml. of concentrated hydrochloric acid in 100 ml. of water was added. The polymer was precipitated and washed with methanol. Intrinsic viscosities were measured in dioxane at 30° C. The amounts and yields of the individual preparations are given below in Table VIII.

TABLE VIII

| PBMA, percent | BPA, g. | PBMA, g. | Phenol, g. | Polymer yield, g. | Polymer (n) dl./g. |
|---|---|---|---|---|---|
| 5 | 57 | 3 | 0.041 | 64 | 0.72 |
| 10 | 54 | 6 | 0.082 | 64 | 0.75 |
| 15 | 51 | 9 | 0.123 | 62 | 0.74 |

Films of the polymers of Table VIII were cast on a glass plate from methylene chloride solution. Properties measured on these films are summarized below in Table IX.

TABLE IX

| Weight PBMA | 5 | 10 | 15 |
|---|---|---|---|
| $(n)$, dl./g. | 0.72 | 0.75 | 0.74 |
| Tensile Heat Distortion, 50 p.s.i. load, °C | 162 | 158 | 162 |
| Tensile Modulus, p.s.i.×$10^{-5}$ | 2.09 | 1.78 | 1.72 |
| Yield, p.s.i.×$10^3$ | 8.41 | 7.45 | 7.47 |
| Ultimate, p.s.i.×$10^{-3}$ | 9.98 | 8.20 | 8.75 |
| Elongation, percent | 169 | 139 | 210 |
| Critical Elongation, percent: | | | |
| Acetone | 1.62 | 1.47 | 1.49 |
| Heptane | 2.90 | 0.60 | 1.25 |
| $CCl_4$ | 1.01 | 2.13 | 3.22 |

Example 10

A solution of 51.5 g. styrene, 0.36 g. acrylic acid and 1 g. 4,4′-azo-bis-isobutyronitrile in 100 g. of toluene was refluxed under an atmosphere of nitrogen for 6.5 hours. Precipitation in methanol produced 29.3 g. of polymer which had an intrinsic viscosity in toluene at 25° C. of 0.13, which corresponds to a molecular weight of 16,600.

Example 11

A solution of poly(styrene-co-acrylic acid) (PS), prepared as in Example 10, bisphenol-A and phenol in 47.5 g. of pyridine and 400 g. of methylene chloride was phosgenated at 0.43 g. per minute until a temperature drop occurred. A solution of dilute hydrochloric acid was added, and the polymer was precipitated and washed with methanol. The amounts and yields for the individual preparations are given below in Table X. Intrinsic viscosities were measured in dioxane at 30° C.

TABLE X

| PS, percent | BPA, g. | PS, g. | Phenol, g. | Polymer yield, g. | Polymer $(n)$, dl./g. |
|---|---|---|---|---|---|
| 5 | 57 | 3 | 0.041 | 58 | 0.76 |
| 10 | 54 | 6 | 0.082 | 61 | 0.73 |
| 15 | 51 | 9 | 0.123 | 63 | 0.72 |

Films of the polymers of Table X were cast from methylene chloride solution on a glass plate. Properties measured on these films are summarized below in Table XI.

TABLE XI

| Weight percent PS | 5 | 10 | 15 |
|---|---|---|---|
| $(n)$, dl./g. | 0.76 | 0.73 | 0.72 |
| Tensile Heat Distortion, 50 p.s.i. load, °C | 163 | 154 | 157 |
| Tensile Modulus, p.s.i.×$10^{-5}$ | 2.18 | 2.28 | 2.28 |
| Yield, p.s.i.×$10^{-3}$ | 9.97 | 9.83 | 9.18 |
| Ultimate, p.s.i.×$10^{-3}$ | 10.8 | 9.50 | 8.87 |
| Elongation, percent | 161 | 145 | 141 |
| Critical Elongation for Craze: | | | |
| Acetone | 1.10 | 1.31 | 0.73 |
| Heptane | 0.35 | 0.41 | 0.26 |
| $CCl_4$ | 0.86 | 0.92 | 0.65 |

Example 12

A mixture of 108 g. bisphenol-A, 12 g. of polyethylene modified to contain carboxyl groups (Surlyn A sold by Du Pont), 0.47 g. phenol, 90 g. pyridine and 800 g. chlorobenzene was heated to reflux. All dissolved except the Surlyn A which had formed a fibrous gel. The mixture was phosgenated at 1 g. per minute and after one minute the fibrous gel of Surlyn A dissolved. Phosgenation of the refluxing solution was continued for 53 minutes, after which the solution was cooled. A dilute solution of hydrochloric acid was added, and the polymer was precipitated and washed with methanol. A white powder, 122 g. was obtained. This powder was insoluble in chloroform at 25° C., and in dioxane at 80° C. It was soluble in refluxing tetrachloroethane.

A compression molded sheet of the material produced in Example 17 was cut into tensile bars, and these had a modulus of 1.72×$10^5$ p.s.i., a yield strength of 6,430 p.s.i., and an ultimate strength of 7,280 p.s.i., and they elongated 67% before breaking.

Example 13

A solution of 80.5 g. acrylonitrile, 2.88 g. acrylic acid, and 1.50 g. benzoyl peroxide in 258 g. of styrene was added to a solution of 8 g. of disodium hydrogen phosphate and 90 g. of a 5 weight percent aqueous solution of polyacrylic acid (Carbopol 940 sold by B. F. Goodrich) in 1,500 ml. of water. The suspension was stirred and heated under a nitrogen atmosphere for 18 hours. The mixture was filtered and the beads washed with water and dried. The beads had an intrinsic viscosity in toluene at 25° C. of 0.61 dl./g.

Example 14

A solution of 72 g. bisphenol-A, 48 g. poly(styrene-co-acrylonitrile-co-acrylic acid) (PSAN), 0.56 g. phenol and 90 g. pyridine in 800 g. methylene chloride was phosgenated at a rate of 1 g. per minute until a temperature drop occurred. A solution of dilute hydrochloric acid was added and the polymer was precipitated and washed with methanol. A white powder, 124 g., was obtained, and it had an intrinsic viscosity in dioxane at 30° C. of 0.74 dl./g.

Example 15

A solution of bisphenol-A, (PSAN), monofunctional reagent and 45 g. pyridine in 400 g. methylene chloride was phosgenated at 0.5 g. per minute until a temperature drop occurred. After adding a solution of dilute hydrochloric acid, the polymer was precipitated, washed with methanol, and dried. Intrinsic viscosities were measured in dioxane at 30° C. with the results illustrated in Table XII below.

TABLE XII

| Monofunctional reagent | BPA, g. | PSAN, g. | Monofunctional reagent, g. | Polymer yield, g. | $(n)$, dl./g. |
|---|---|---|---|---|---|
| Cyclohexanol | 51 | 9 | 0.130 | 59 | 0.86 |
| Methanol | 54 | 6 | 0.025 | 58 | 0.82 |
| p-Bromophenol | 57 | 3 | 0.070 | 63 | 0.99 |
| None | 54 | 6 | | | Gelled |

Example 16

A solution of 51 g. of the bisphenol, 9 g. PSAN, 0.12 g. phenol and 45 g. pyridine in 400 g. methylene chloride was phosgenated at a rate of 0.5 g. per minute until the temperature dropped. A dilute solution of hydrochloric acid was added, and the polymer was precipitated, washed with methanol, and dried. Intrinsic viscosities were measured in dioxane at 30° C. giving the results shown in Table XIII below.

TABLE XIII

| Bisphenol | Polymer yield, g. | $(n)$, dl./g. |
|---|---|---|
| 2,2 bis(3,5-dibromo-4-hydroxylphenyl)propane | 54 | 0.34 |
| 2,2 bis(3-methyl-4-hydroxyphenyl)propane | 61 | 0.64 |

Example 17

A solution of 0.28 g. acrylic acid in 100 g. lauryl methacrylate was added to a solution of 2 g. of a surfactant (Rohm and Haas QS–5) in 200 g. of water which had been adjusted to pH 9 with a sodium hydroxide solution. After adding 0.04 g. ammonium persulfate, the emulsion was heated at 80° C.–90° C. for two hours. The polymer was coagulated with a saturated sodium chloride solution and washed with water. The polymer had an intrinsic viscosity in n-butyl acetate at 23° C. of 1.125 dl./g. which corresponds to a molecular weight of 2.70×$10^6$.

Example 18

A solution of bisphenol-A, poly(lauryl methacrylate-co-acrylic acid) (PLMA), phenol and 96 g. pyridine in 800 g. methylene chloride was phosgenated at a rate of 0.9 g. per minute until the temperature dropped. A dilute solution of hydrochloric acid was added, and the polymer was precipitated and washed with methanol. The amounts and yields of the polymers are given below in Table XIV. Intrinsic viscosities were measured in dioxane at 30° C.

TABLE XIV

| PLMA, weight percent | BPA, g. | PLMA, g. | Phenol, g. | Polymer yield, g. | (n), dl./g. |
|---|---|---|---|---|---|
| 5 | 114 | 6 | 0.08 | 115 | 0.83 |
| 10 | 108 | 12 | 0.16 | 113 | 0.82 |
| 15 | 102 | 18 | 0.24 | 112 | 0.78 |
| 25 | 90 | 30 | 0.40 | 107 | 0.73 |

Example 19

A solution of 200 g. butyl methacrylate, 1.86 g. hydroxyethyl methacrylate, 1 g. benzoyl peroxide and 1 g. pyridine in 300 g. methylene chloride was heated at reflux for 22 hours. The polymer was precipitated and washed with methanol, and then it was washed with water. After drying under reduced pressure, 110 g. of polymer was obtained. This material had an intrinsic viscosity in chloroform at 25° C. of 1.14 dl./g. which corresponds to a molecular weight of 331,000.

Example 20

A solution of poly(butyl methacrylate-co-hydroxy-ethyl methacrylate) (PBMHEM), prepared as in Example 24 bisphenol-A and phenol in 96 g. pyridine and 800 g. methylene chloride was phosgenated at a rate of 0.86 g. per minute until a temperature drop occurred. After adding a solution of dilute hydrochloric acid, the polymer was precipitated and washed with methanol. Intrinsic viscosities were measured in dioxane at 30° C. The amounts and yields for the individual preparations are given below in Table XV.

TABLE XV

| PB HEM, percent | BPA, g. | PBHEM, g. | Phenol, g. | Polymer yield, g. | Polymer (n), dl./g. |
|---|---|---|---|---|---|
| 5 | 114 | 6 | 0.08 | 112 | 0.91 |
| 10 | 108 | 12 | 0.16 | 120 | 0.81 |
| 15 | 102 | 18 | 0.25 | 126 | 0.75 |
| 25 | 90 | 30 | 0.40 | 119 | 0.71 |

Example 21

A solution of hydroxyethyl methacrylate (HEM) and benzoyl peroxide ($Bz_2O_2$) in styrene was added to a solution of polyacrylic acid (PAA) in water. The mixture was stirred and heated under a nitrogen atmosphere at 80° C. for 16 hours. The polymer beads were filtered and washed with water. Intrinsic viscosities were measured in toluene at 25° C. The amounts used in the individual preparations are given below in Table XVI.

TABLE XVI

| Styrene, g. | HEM, g. | $BzO_2$, g. | PAA, g. | $H_2O$, g. | Polymer yield, g. | (n), dl./g. | Molecular weight |
|---|---|---|---|---|---|---|---|
| 208 | 2.60 | 0.50 | 2.50 | 750 | 170 | 1.08 | 405,000 |
| 416 | 5.20 | 1.00 | 4.50 | 1,500 | 385 | 0.71 | 223,000 |

Example 22

A solution of poly(styrene-co-hydroxyethyl methacrylate) (PSHEM), prepared as in Example 21, bisphenol-A and phenol in methylene chloride ($MeCl_2$) and pyridine was phosgenated 0.5 g. per minute until a temperature drop was observed. A solution of dilute hydrochloric acid was added and the polymer was precipitated and washed with methanol. Intrinsic viscosities were measured in dioxane at 30° C. The amounts and yields for individual preparations are given below in Table XVII.

TABLE XVII

| PSHEM, percent | BPA, g. | PSHEM, g. | Phenol, g. | Pyridine, g. | $MeCl_2$, g. | Polymer yield, g. | (n), dl./g. |
|---|---|---|---|---|---|---|---|
| 50 | 30 | 30 | 1.05 | 25 | 400 | 60 | 1.15 |
| 40 | 72 | 48 | 1.24 | 90 | 800 | 113 | 0.85 |
| 30 | 84 | 36 | 1.32 | 90 | 800 | 124 | 0.47 |

Experience indicates that the grafting technique of this invention can be applied to any vinyl polymer or copolymer for which there is a solvent. By the selection of backbone polymers as well as the adjustment of conditions to control the backbone polymer chain length and the graft polymer chain length, it is possible to engineer vinyl copolymers with maximum properties of the type desired in the final product. Accordingly, it is intended that the invention described herein shall be limited in scope only as may be necessitated by the scope of the appended claims.

This invention is directed to a thermoplastic graft copolymer of (a) a polymer backbone containing functional groups pendant thereon and (b) an aromatic polycarbonate group. The functional groups pendant on the polymer backbone are either hydroxyl, carboxyl or amine groups, or mixtures thereof. Preferably, the polymer backbone contains an average of less than about 50 functional groups per molecule of the polymer backbone. In the practice of this invention, "pendant" means that the applicable functional group is not part of the polymer backbone chain but is a side group therefrom. Thus the functional group provides a site for the condensation of the aromatic polycarbonate side chains.

The critical feature of the instant invention is that the graft copolymer must be thermoplastic. To insure this, the number of functional groups pendant on the polymer backbone must not be excessive. Otherwise, the graft copolymer prepared from the polymer backbone and the aromatic polycarbonate will gel or cross-link and not remain thermoplastic. Preferably, the number of functional groups pendant on the polymer backbone is less than 50.

The polymer backbone employed in the practice of this invention may be either a homopolymer, a copolymer or an interpolymer. The essential feature as stated previously is that the polymer backbone must be such that the functional groups are not excessive so as to avoid gelling or cross-linking when reacting the aromatic polycarbonate therewith. A copolymer backbone can be prepared from two monomers containing functional groups or two monomers wherein only one of the monomers contains functional groups. The important feature is that the degree of functionality not be excessive. In addition, an interpolymer backbone can be made by polymerizing monomers of the same type employed to prepare a copolymer backbone. Again the essential feature is that the resulting graft copolymer must be thermoplastic and not contain excessive functional groups.

To determine the number of functional groups or functionality, the following formula is used to determine functionality:

$f = (\overline{P}_n)$ (mole fraction of functional groups in the polymer)

$f$ = functionality $\overline{P}_n$ = No. average degree of polymerization

The thermoplastic polymers employed to prepare the polymer backbone can be any thermoplastic polymer containing functional groups of either hydroxyl, carboxyl or amines, or mixtures thereof. Examples of some of the thermoplastic polymers which can be employed in the practice of this invention to prepare the polymer backbone are homopolymers, copolymers and interpolymers of cellulose ethers and esters containing free hydroxyl, carboxyl or amine groups e.g., ethyl cellulose, cellulose acetate, cellulose nitrate, cellulose butyrate; homopolymers, copolymers and interpolymers of monomeric compounds containing the vinylidene group $CH_2=C<$ such as unsaturated carboxylic acids and derivatives thereof, e.g., acrylic acid, methacrylic acid, acrylic acid and methacrylic acid monoesters of glycols; allyl alcohol; alpha-beta-unsaturated polycarboxylic acid and derivatives thereof i.e., maleic anhydride, etc. In addition, the thermoplastic polymers can be copolymers and interpolymers of the above functional containing monomeric compounds with monomeric compounds containing the vinylidene group $CH_2=C<$ without functional groups and include such monomeric compounds as vinyl halides, e.g., vinyl chloride, vinyl bromide, vinylidene chloride; olefins, e.g., ethylene, propylene, isobutylene; acrylic acid and methacrylic acid esters of alcohols containing 1–18 carbon atoms such as methyl and ethyl methacrylate, acrylamide, methacrylamide, methacrylonitrile, acrylonitrile; vinyl esters of carboxylic acids, e.g., vinyl acetate, vinyl propionate, vinyl benzoate; vinyl ethers, e.g., vinyl methyl ether, vinyl isobutyl ether; vinyl aromatic compounds, e.g., styrene, alpha-methylstyrene, vinyl toluene, p-ethylstyrene, 2,4-dimethylstyrene, o-chlorostyrene, 2,5-dichlorostyrene, etc. The preferred polymer backbone to be employed in the practice of this invention is butyl methacrylate-hydroxyethyl methacrylate or styrene-hydroxyl ethyl acrylate.

In the practice of this invention, the graft copolymer is prepared by reacting the polymer backbone with a dihydric phenol and a carbonate precursor in the presence of an acid acceptor and a chain stopper. The polymer backbone is first dissolved in an organic solvent. To this is then added the dihydric phenol, the chain stopper and the acid acceptor. A stoichiometric quantity of the carbonate precursor is then fed into the system to react with the dihydric phenol to form an aromatic polycarbonate which then condenses with the functional groups pendant on the polymer backbone. The reaction is carried out at atmospheric pressure and preferably at a temperature of between 20°–130° C. However, these are not limiting factors in the process.

The chain stopper employed in the reaction process is a monofunctional hydroxy compound such as phenol, cyclohexanol, methanol or p-bromophenol. The amount employed is at least one mole of the chain stopper per mole of the hydroxyl, carboxyl or amine group of the polymer backbone. The use of the chain stopper is essential to the process in order to avoid the formation of a gel or cross-linked product. The preferred chain stopper is phenol.

Any dihydric phenol which contains as the sole reactive groups two phenolic hydroxyl groups can be employed in the practice of this invention. Examples of some of the dihydric phenols are bisphenols such as 1,1-bis(4-hydroxyphenyl) methane, 2,2-bis(4-hydroxy phenyl) propane, 4,4-bis(4-hydroxyphenyl) heptane, etc.; dihydric phenol ethers such as bis(4-hydroxyphenyl) ether, bis-(3,5-dichloro-4-hydroxyphenyl) ether, etc.; dihydroxy diphenyls such as p,p'-dihydroxydiphenyl, 3,3-dichloro-4,4'-dihydroxydiphenyl, etc.; dihydroxyaryl sulfones such as bis(4-hydroxyphenyl) sulfone, bis(3,5 - dimethyl - 4 - hydroxyphenyl) sulfone, bis(3-methyl-5-ethyl-4-hydroxyphenyl) sulfone, etc.; dihydroxy benzenes resorcinol, hydroquinone; halo- and alkyl-substituted dihydroxy benzenes such as 1,4-dihydroxy-2-chlorobenzene, 1,4-dihydroxy-2,3-dichlorobenzene, 1,4-dihydroxy - 2 - methylbenzene, etc.; and dihydroxy diphenyl sulfoxides such as bis-4-hydroxyphenyl) sulfoxide, bis(3,5-dibromo-4-hydroxyphenyl) sulfoxide, etc.

The carbonate precursor employed in the practice of this invention can be either carbonyl halide or a haloformate. The carbonyl halides which can be employed herein are carbonyl bromide, carbonyl chloride, carbonyl fluoride, etc., or mixtures thereof. The haloformates suitable for use herein include bishaloformates of dihydric phenols (bischloroformates of hydroquinone, etc.) or glycols (bis-haloformates of ethylene glycol, neopentyl glycol, polyethylene glycol, etc.). While other carbonate precursors will occur to those skilled in the art, carbonyl chloride, also known as phosgene, is preferred.

The reaction is carried out in the presence of an acid acceptor, which acid acceptor may be either an organic or an inorganic compound. A suitable organic acid acceptor is a tertiary amine and includes such materials as pyridine, triethyl amine, dimethyl aniline, tributyl amine, etc. The inorganic acid acceptor may be one which can either be an hydroxide, a carbonate, a bicarbonate or a phosphate of an alkali or alkaline earth metal.

The composition of the instant application has many uses for forming molded parts or for forming sheet and films. The advantage of the instant composition is that it is resistant to organic solvents, has better stress cracking properties than a straight aromatic polycarbonate resin and has excellent heat distortion properties.

It will thus be seen that the objects set forth above, among those made apparent from the preceding description, are efficiently attained, and since certain changes may be made in carrying out the above process and in the composition set forth without departing from the scope of the invention, it is intended that all matters contained in the above description shall be interpreted as illustrative and not in a limiting sense.

What is claimed is:

1. A thermoplastic graft copolymer of (a) a polymeric backbone containing functional groups pendant thereon, said polymer backbone comprising the polymeric reaction product of ethylenically unsaturated monomers, and (b) an aromatic polycarbonate group; said functional groups being selected from the group consisting of hydroxyl, carboxyl and amine groups, and mixtures thereof.

2. The thermoplastic graft copolymer of claim 1 wherein the polymer backbone contains an average of less than about 50 functional groups per molecule.

3. The thermoplastic graft copolymer of claim 1 wherein the polycarbonate is the reaction product of a dihydric phenol and a carbonate precursor selected from the group consisting of carbonyl halides and haloformates, and mixtures thereof.

4. The thermoplastic graft copolymer of claim 1 wherein the polymer backbone is a butyl methacrylate-hydroxyl ethyl-methacrylate copolymer.

References Cited

UNITED STATES PATENTS

| | | | |
|---|---|---|---|
| 2,524,045 | 10/1950 | Flory | 260—857 |
| 2,575,585 | 11/1951 | Cox et al. | 260—77.5 |
| 2,842,519 | 7/1958 | Ripley-Duggan | 260—860 |
| 3,161,615 | 12/1964 | Goldberg | 260—47 |
| 3,280,218 | 10/1966 | Endsley | 260—874 |

MURRAY TILLMAN, Primary Examiner

J. T. GOOLKASIAN, Assistant Examiner

U.S. Cl. X.R.

260—13, 16, 47